(12) United States Patent
Reial et al.

(10) Patent No.: US 11,647,447 B2
(45) Date of Patent: May 9, 2023

(54) CANDIDATE LINK LOCATING BY A WIRELESS TERMINAL

(71) Applicant: Telefonaktiebolaget LM Ericsson (publ), Stockholm (SE)

(72) Inventors: Andres Reial, Malmö (SE); Icaro L. J. da Silva, Solna (SE); Johan Rune, Lidingö (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1285 days.

(21) Appl. No.: 15/524,409

(22) PCT Filed: Jun. 22, 2016

(86) PCT No.: PCT/EP2016/064393
§ 371 (c)(1),
(2) Date: May 4, 2017

(87) PCT Pub. No.: WO2017/220135
PCT Pub. Date: Dec. 28, 2017

(65) Prior Publication Data
US 2018/0213470 A1     Jul. 26, 2018

(51) Int. Cl.
*H04W 40/02*     (2009.01)
*H04W 48/16*     (2009.01)
(Continued)

(52) U.S. Cl.
CPC ........... *H04W 48/16* (2013.01); *H04L 45/304* (2013.01); *H04W 36/0061* (2013.01);
(Continued)

(58) Field of Classification Search
CPC ............. H04W 16/28; H04W 36/0011; H04W 36/0055; H04W 36/14; H04W 48/16;
(Continued)

(56) References Cited

U.S. PATENT DOCUMENTS 7,395,351 B1 * 7/2008 Nucci ................. H04L 41/0654
370/238
8,971,956 B2 * 3/2015 Do ........................ H04B 7/2606
455/555
(Continued)

FOREIGN PATENT DOCUMENTS

CN     104159241 A     11/2014
EP     2173125 A1     4/2010
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.
(Continued)

*Primary Examiner* — Salvador E Rivas
(74) *Attorney, Agent, or Firm* — Murphy, Bilak & Homiller, PLLC

(57) ABSTRACT

A link locating assisting device in a wireless communication network (10) obtains search limitation data concerning the wireless communication network and sends the search limitation data (SLD) to the wireless terminal (12) via a serving network node (14) and a serving link (SLK) for use in obtaining limitations for limiting a search for a set of candidate links (CLK1, CLK2, CLK3). The wireless terminal (12) obtains the search limitation data (SLD), sets limitations for a link search based on the search limitation data, search for candidate links starting with a current link search setting used with the serving link (SLK), and continues searching for candidate links with an offset from the current link search setting that grows with every search until the search limitations have been met.

38 Claims, 6 Drawing Sheets

(51) Int. Cl.
  *H04W 36/00* (2009.01)
  *H04L 45/302* (2022.01)
  *H04W 72/02* (2009.01)
  *H04W 28/08* (2023.01)
  *H04M 1/72* (2021.01)

(52) U.S. Cl.
  CPC ....... *H04W 36/0094* (2013.01); *H04W 40/02* (2013.01); *H04L 45/302* (2013.01); *H04M 1/72* (2013.01); *H04W 28/0942* (2020.05); *H04W 40/026* (2013.01); *H04W 72/02* (2013.01)

(58) Field of Classification Search
  CPC ......... H04W 36/0061; H04W 36/0094; H04W 40/02; H04W 40/026; H04W 72/02; H04W 28/0942; H04L 45/302; H04L 45/304; H04M 1/72; H01M 2/1011
  See application file for complete search history.

(56) References Cited

U.S. PATENT DOCUMENTS

| | | |
|---|---|---|
| 2001/0040933 A1 | 11/2001 | Eriksson et al. |
| 2002/0114295 A1* | 8/2002 | Takahiro ............. H04W 72/563 370/441 |
| 2003/0152046 A1* | 8/2003 | Kawai ................... H04W 72/02 370/348 |
| 2004/0252656 A1 | 12/2004 | Shiu et al. |
| 2005/0201449 A1* | 9/2005 | Churan ................ H04B 7/2125 375/149 |
| 2007/0082609 A1* | 4/2007 | Kiesling .............. H04B 7/2041 455/12.1 |
| 2007/0105508 A1* | 5/2007 | Tong ..................... H04L 1/0069 455/101 |
| 2008/0096581 A1 | 4/2008 | Do et al. |
| 2008/0157959 A1* | 7/2008 | Kuris ................... A61B 5/0002 340/539.22 |
| 2009/0270079 A1* | 10/2009 | Han .................. H04W 36/0061 455/414.1 |
| 2010/0150212 A1* | 6/2010 | Sheshadri ............ H04B 1/7117 375/148 |
| 2010/0195525 A1* | 8/2010 | Eerolainen ...... H04W 36/00835 370/252 |
| 2011/0002232 A1* | 1/2011 | Niewczas ............ H04B 1/7085 370/252 |
| 2011/0098912 A1* | 4/2011 | Baselau ................. G01C 21/34 701/532 |
| 2013/0258883 A1 | 10/2013 | Vargas Bautista et al. |
| 2014/0045505 A1* | 2/2014 | Henry ................... H04W 36/04 455/444 |
| 2015/0304905 A1* | 10/2015 | Gao ................ H04W 36/00835 455/11.1 |

FOREIGN PATENT DOCUMENTS

| | | |
|---|---|---|
| EP | 2373084 A1 | 10/2011 |
| KR | 20050085365 A | 8/2005 |
| WO | 2016072886 A1 | 5/2016 |
| WO | 2016079016 A1 | 5/2016 |

OTHER PUBLICATIONS

Unknown, Author, "Maximum UL Transmission timing difference in dual connectivity", 3GPP TSG-RAN WG2 Meeting #93, R2-161702, St. Julian's, Malta, Feb. 15-19, 2016, 1-3.

* cited by examiner

CANDIDATE LINK LOCATING BY A WIRELESS TERMINAL

TECHNICAL FIELD

The present disclosure relates to the locating of candidate links in a wireless communication network. More particularly, the disclosure relates to a method, a link locating assisting device, computer program and computer program product for simplifying for a wireless terminal to locate candidate links as well as to a method, a wireless terminal, computer program and computer program product for locating a set of candidate links.

BACKGROUND

Handover is an important part of any mobile communications system. In legacy systems, handover is the process of transferring an ongoing connection of a wireless terminal, often termed user equipment (UE), from one base station (the serving node) to another base station (the target node), or from one cell to another within the same base station. This is done to accomplish a transparent service or service continuity over a larger area. The handover should happen without any loss of data and preferably with no interruption.

In legacy cell-based systems like Long Term Evolution (LTE), the so-called cell-specific reference signals (CRSs) are used for mobility measurements. These are broadcasted in all neighbour cells in an always-on manner over the entire bandwidth, regardless of the presence or position of UEs in the system. The CRS are easy to measure and yield consistent results, but static CRS signalling leads to high resource usage, power consumption and constant inter-cell interference generation in the downlink. All base stations, termed eNodeBs in LTE, continuously transmit pilot signals that UEs in own and neighbour cells use to estimate the target cell quality and timing. This is also true in Global System for Mobile Communications (GSM) where a pilot signal is transmitted on a Broadcast Control CHannel (BCCH), Wideband Code Division Multiple Access (WCDMA) where a pilot signal is transmitted on a Common Pilot CHannel (CPICH) and in WiFi (beacon signal). The UEs perform periodic measurements and report the measurements to the network when certain reporting conditions are met (periodic or event based). If it is detected that the serving cell quality is getting close to the quality of another candidate cell, a more detailed measurement process or a handover procedure may be initiated.

Modern cellular systems will use advanced antenna systems to a large extent. With such antenna arrays, data signals will be transmitted in narrow beams to increase signal strength in some directions, and/or to reduce interference in other directions. When the antenna array is used to increase coverage, the serving and target node identities are no longer sufficient for maintaining seamless connections during inter-node handover. Handover management between narrow beams in neighbouring base stations becomes a necessity, and the serving base station also needs to decide if a beam switch or beam update is necessary within the own cell. A beam through which a base station is currently communicating with a UE may be called a serving beam and the beam it will hand over or switch to a target beam.

In a beam-based system like New Radio (NR) (previously denoted NX), it is desired to avoid static signalling, so instead the Network (NW), i.e. a base station, turns on Mobility and access reference Signal (MRS) in a UE-specific manner only in relevant candidate beams. It is done when the NW determines that a beam update for the UE may be needed, e.g. when decreasing serving beam quality is detected. The NW requests the UE to measure and report candidate beam quality. Each activated beam transmits a MRS that contains a timing synchronization Signal (TSS), which is a timing synchronization component whose contents may be common to multiple beams and a beam specific reference signal (BRS), which is a beam identity component that is beam-specific.

The NW deployment patterns vary. Some networks, or parts of them, may be synchronized and have small inter-site distances (ISD), e.g. hotspot coverage using low-power nodes (LPNs). Other network layers, e.g. macro deployments, may be operated using roughly synchronized nodes with large ISD, or the nodes may be completely unsynchronized in time.

In legacy networks (such as 3G with WCDMA/HSPA or 4G systems with LTE) where the UE is not provided a list of candidate beams or cells to measure, the UE performs a continuous reference signal search over a predefined time/frequency (t/f) search window to detect any beams/cells that may be audible. In LTE, for example, UEs in Radio Resource Control (RRC) Connected state are configured with a neighbour cell list whose physical cell identities (PCIs) correspond to the primary and secondary synchronization sequences (PSS and SSS) that can be detected and used for synchronizing with the neighbour cells and perform measurements. Synchronization in LTE consists of a coarse frequency and symbol time estimation (from the PSS) and a frame timing estimation (from the SSS). Synchronization, or timing offset estimation, is typically performed by comparing the received signals to multiple reference signal hypotheses that correspond to different offsets. The bulk of the searching effort is associated with time domain correlation of the PSS for different offset hypotheses. Out of the correlation results for many hypotheses, the largest correlation peak is used for determining the offset estimate.

In beam-based systems like NR/NX, the list of candidate beam identities may be included in the measurement configuration during preparations for mobility measurements or multi-connectivity establishment. It is also possible that measurement procedures without knowledge of the candidate beams will be performed in future 5G systems. This is relevant for building automatic neighbour relation between beams/nodes/cells or in the event of a transition from a sleeping state to active where the UE might have moved and was not configured with proper candidate beams to search for.

Some of the candidate beams for the UE to measure may originate at the serving node, but some may be transmitted from other nodes whose timing and frequency references with regard to the UE may be different. That may be due to a non-negligible ISD, whereby the downlink (DL) timing is "slightly" off with regard to the serving node timing. In other cases, when the nodes are only loosely synchronized, or not synchronized at all, the new DL timing may have limited or no relation to the serving node timing. UE movement may lead to different Doppler properties and frequency offsets with respect to the different nodes.

If the candidate beam list is included in the measurement configuration, the UE may thus not be aware of which candidate beams require additional timing synchronization (and to which extent) prior to being able to detect the presence of the MRS and perform quality measurements. Similarly, if the candidate beam list is not included in the measurement request, the UE does not know whether it should blindly look for well-synchronized, slightly offset, or randomly timed beams. Always performing full time synchronization is in general an inefficient solution.

There is thus a need for reducing the UE synchronization effort in link search without relying on extensive control signalling, where a link may be a beam, cell, network sector or node.

SUMMARY

The disclosure is therefore directed towards improving the way a wireless terminal locates candidate links.

This object is according to a first aspect achieved through a method for locating a set of candidate links in a wireless communication network by a wireless terminal when communicating with a serving network node via a serving link. The method is performed by the wireless terminal and comprises the steps of:

obtaining search limitation data, setting search limitations for a link search based on the search limitation data, searching for candidate links starting with a current link setting used with the serving link, and continuing searching for candidate links with an offset from the current link setting that grows with every search until the search limitations have been met.

The object is according to a second aspect achieved by a wireless terminal for locating a set of candidate links in a wireless communication network when communicating with a serving network node via a serving link. The wireless terminal comprises a processor circuit acting on computer instructions whereby the wireless terminal is configured to:

obtain search limitation data, set limitations for a link search based on the search limitation data, search for candidate links starting with a current link search setting used with the serving link, and continue searching for candidate links with an offset from the current link search setting that grows with every search until the search limitations have been met.

The object is according to a third aspect achieved through a wireless terminal for locating a set of candidate links in a wireless communication network when communicating with a serving network node via a serving link. The wireless terminal comprises:

means for obtaining search limitation data, means for setting search limitations for a link search based on the search limitation data, means for searching for candidate links starting with a current link setting used with the serving link, and means for continuing searching for candidate links with an offset from the current link setting that grows with every search until the search limitations have been met.

The object is according to a fourth aspect achieved through a computer program for locating a set of candidate links in a wireless communication network by a wireless terminal when communicating with a serving network node via a serving link. The computer program comprises computer program code which when run in a wireless terminal, causes the wireless terminal to:

obtain search limitation data, set search limitations for a link search based on the search limitation data, search for candidate links starting with a current link search setting used with the serving link, and continue searching for candidate links with an offset from the current link search setting that grows for every search until the search limitations have been met.

The object is according to a fifth aspect achieved through a computer program product for locating a set of candidate links in a wireless communication network by a wireless terminal when communicating with a serving network node via a serving link. The computer program product comprises a data carrier with computer program code according to the fourth aspect.

The offset may comprise a time component. Additionally, or instead, it may comprise a frequency component. A specific offset component may furthermore be applied with a positive sign and with a negative sign.

In a first variation of the first aspect, the method further comprises informing the serving network node about the offsets for which candidate links have been located with the used search limitations.

In a corresponding variation of the second aspect, the wireless terminal is further configured to inform the serving network node about the offsets for which candidate links have been located with the used search limitations.

In a second variation of the first and second aspects, the search limitations comprise a maximum allowed offset and the search is ended in case the maximum allowed offset is reached.

In a third variation of the first and second aspects, the obtaining of search limitation data involves receiving search limitation data from the wireless communication network, which may be via the serving link or a previous communication with the wireless communication network.

In a fourth variation of the first aspect, the obtaining of search limitation data comprises receiving link identifying data, the setting of search limitations comprises setting candidate links identified in the link identifying data as search limitations and the continuing of searching for candidate links until the search limitations have been met, comprises stopping the search when the candidate links identified in the link identifying data have been found.

In a corresponding variation of the second aspect, the wireless terminal is further configured to receive link identifying data when receiving search limitation data, set candidate links identified in the link identifying data as search limitations and stop the search when the candidate links identified in the link identifying data have been found when continuing searching until the search limitations have been met.

In a fifth variation of the first aspect, the receiving of search limitation data comprises receiving wireless network node deployment data and the setting of search limitations comprises determining the maximum allowed offset based on the received deployment data.

In a corresponding variation of the second aspect, the wireless terminal, when obtaining search limitation data, is configured to receive wireless network node deployment data and when setting search limitations for a link search is configured to determine the maximum allowed offset based on the received wireless network node deployment data.

In both cases a maximum allowed offset may be a maximum allowed time offset, a maximum allowed frequency offset or a maximum allowed frequency and time offset.

In a sixth variation of the first and second aspects, the wireless network node deployment data comprises a frequency offset element defining a maximum permitted inter-node frequency and the maximum allowed offset comprises a maximum allowed frequency component that is based on the frequency offset element.

In a seventh variation of the first aspect, the method further comprises determining a movement based frequency offset element of the maximum allowed frequency component through identifying a Doppler shift.

In a corresponding variation of the second aspect, the wireless terminal is further configured to determine a movement based frequency offset element of the maximum allowed frequency component through identifying a Doppler shift.

According to an eighth variation of the first and second aspects, the wireless network node deployment data comprises a timing offset element defining a maximum allowed timing offset and the maximum allowed offset comprises a maximum allowed timing component that is based on the timing offset element.

In a ninth variation of the first aspect, the method further comprises determining a clock instability timing offset element of the maximum allowed timing component.

In a corresponding variation of the second aspect, the wireless terminal is further configured to determine a clock instability timing offset element of the maximum allowed timing component.

According to a tenth variation of the first and second aspects the search limitation data comprises search limitation data that has been autonomously determined by the wireless terminal. This is thus search limitation data determined by the wireless terminal without assistance from the wireless communication network.

According to a sixth aspect, the above-described object is furthermore achieved through a method of simplifying for a wireless terminal to locate candidate links in a wireless communication network when communicating with a serving network node via a serving link. The method is performed by a link locating assisting device and comprises:

obtaining search limitation data concerning the wireless communication network, and sending the search limitation data to the wireless terminal for use in obtaining search limitations for limiting a search for a set of candidate links.

According to a seventh aspect, the object is also achieved through a link locating assisting device in a wireless communication network for simplifying for a wireless terminal to locate candidate links when communicating with a serving network node via a serving link. The device comprises a processor circuit acting on computer instructions whereby the link locating assisting device is configured to:

obtain search limitation data concerning the wireless communication network, and send the search limitation data to the wireless terminal for use in obtaining limitations for limiting a search for a set of candidate links.

According to an eighth aspect, the object is achieved through a link locating assisting device in the wireless communication network for simplifying for a wireless terminal to locate candidate links when communicating with a serving network node via a serving link, where the link locating assisting device comprises:

means for obtaining search limitation data concerning the wireless communication network, and means for sending the search limitation data to the wireless terminal for use in obtaining search limitations for limiting a search for a set of candidate links.

According to a ninth aspect, the object is also achieved through a computer program for simplifying for a wireless terminal to locate candidate links in a wireless communication network when communicating with a serving network node via a serving link. The computer program comprises computer program code which when run in a link locating assisting device in the mobile communication network, causes the link locating assisting device to obtain search limitation data concerning the wireless communication network, and send said search limitation data to the wireless terminal for use in obtaining search limitations for limiting a search for a set of candidate links.

According to a tenth aspect, the object is finally achieved through a computer program product for a wireless terminal to locate candidate links in a wireless communication network when communicating with a serving network node via a serving link. The computer program product comprises a data carrier with computer program code according to the ninth aspect.

The search limitation data may be sent periodically or be event or command triggered.

The search limitation data may comprise candidate link identifying data.

The search limitation data may also comprise wireless network node deployment data for use by the wireless terminal to set a maximum allowed offset in locating candidate links using offsets related to the serving link The wireless network node deployment data may furthermore comprise network configurations, such as intersite distance and maximum permitted internode timing misalignment.

The wireless network node deployment data may also comprise a maximum permitted internode frequency offset for use by the wireless terminal to set the maximum allowed offset.

The search limitation data may also comprise measurement data, such as wireless terminal position, wireless terminal speed, angle of arrival and direction of downward link serving the wireless terminal.

According to a first variation of the sixth aspect, the method further comprises receiving information from the wireless terminal about located candidate links and the offsets used by the wireless terminal when locating them.

According to a corresponding variation of the seventh aspect, the link locating assisting device is further configured to receive information from the wireless terminal about located candidate links and the offsets used by the wireless terminal when locating them.

According to a second variation of the sixth aspect, the method further comprises instructing the wireless terminal to locate candidate links.

According to a corresponding variation of the seventh aspect, the link locating assisting device is further configured to instruct the wireless terminal to locate candidate links.

The aspects and embodiments have a number of advantages. The location of candidate links may be made fast. Thereby it may be possible to avoid problems such as loss of contact with a link before handover can be made. Furthermore, the search effort is typically reduced compared with the conventional link search. Another advantage is that the computational load in the wireless terminal may be reduced. This also means that the energy consumed by the wireless terminal is reduced.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The embodiments will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the disclosure. However, it will be apparent to those skilled in the art that the disclosure may be practiced in other embodiments that depart from these specific details. In other instances, detailed descriptions of well-known devices, circuits, and methods are omitted so as not to obscure the description of the disclosure with unnecessary detail.

The present disclosure concerns handover in a wireless communication network, for instance a mobile communication network like a Long-Term Evolution (LTE), Universal Mobile Telecommunications System (UMTS), Global System for Mobile Communications (GSM) and fifth generation network such as NR. These are just a few examples of networks where the embodiments of the invention may be implemented. Another type of network that may be used is a Wireless Local Area Network (WLAN).

Figure 1:
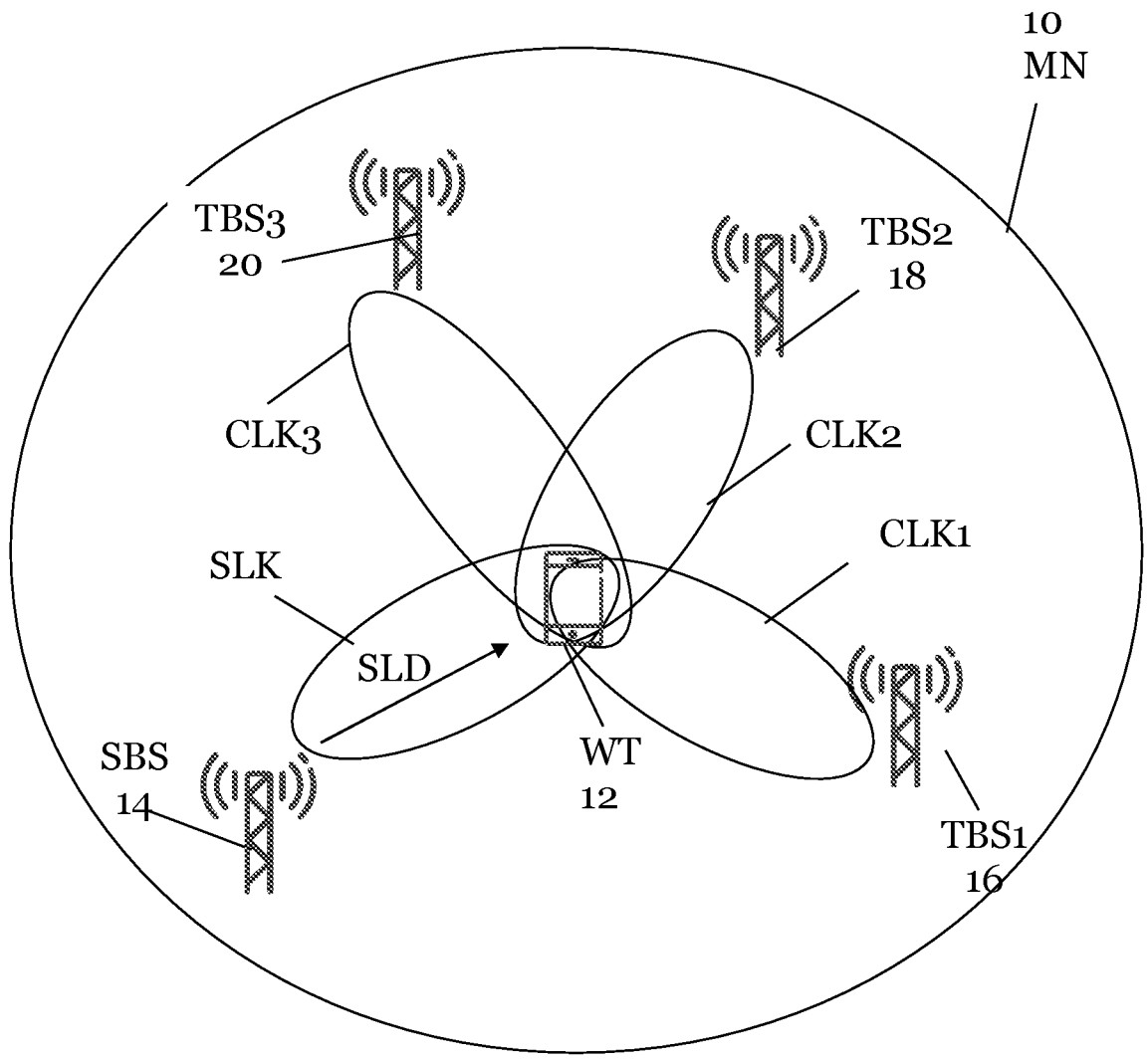
FIG. 1 schematically shows a wireless communication network comprising four neighbouring base stations and a wireless terminal within coverage of the base stations, FIG. 2 schematically shows a candidate link comprising a mobility and access reference signal.

FIG. 1 schematically shows a wireless communication network 10, which may be a network according to any of the above described types. Furthermore, the exemplifying communication network is in this case a mobile communication network MN comprising a serving base station SBS 14. There is also a first candidate target base station TBS 16, a second candidate target base station TBS2 18 and a third candidate target base station TBS3 20. The serving base station 14, which is a serving network node, provides a serving link SLK, while the first, second and third candidate target base stations 16, 18 and 20 provide candidate links CLK1, CLK2 and CLK3 respectively. A link may here be a beam, which is for instance the case in NR. However, it may also be a cell, sector, or transmission point via which communication can be carried out between a base station and a wireless terminal. It may also be a network node.

In FIG. 1 there is also shown a wireless terminal WT 12 which is indicated as being located within the coverage of each of the links SLK, CLK1, CLK2 and CLK3. It may more particularly be located in the coverage of the serving link SLK provided by the serving base station 14 but need to be handed over to a target link handled by a target base station, of which the base stations 16, 18 and 20 are candidates. A serving base station and a serving link is therefore a base station and link with which the wireless terminal is communicating, while a candidate base station and a candidate link is a base station and link with which a wireless terminal may start to communicate. Because of this the wireless terminal 12, which in many systems is termed user equipment (UE), is able to communicate with all base stations 14, 16, 18 and 20. Some of this communication is schematically indicated in FIG. 1. The wireless terminal 12 is shown as receiving search limitation data SLD from the serving base station 14.

The base stations 14, 16, 18 and 20, which are often termed eNodeBs or just NodeBs, are furthermore provided in a part of the mobile communication network 10 termed access network or radio access network. In the mobile communication network 10 there may also be a core network. This is not central to the various aspects to be described and has therefore been omitted.

The wireless terminal may be a mobile phone, often termed a user equipment (UE). It may also be a machine device for machine-to-machine communication.

Figure 2:
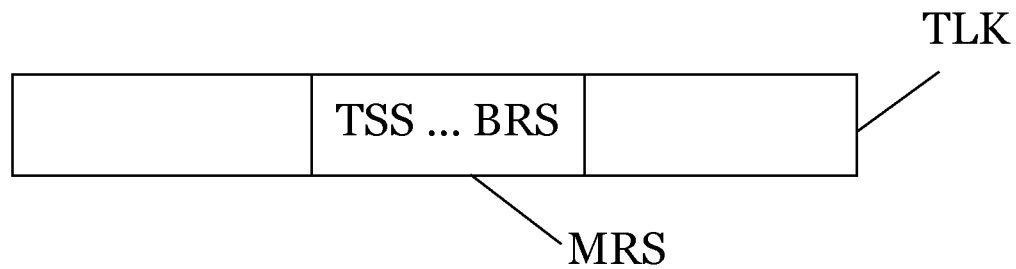

FIG. 2 schematically shows some information that may be transmitted in a link and especially in a candidate link. There may be transmitted a mobility access and reference signal (MRS), which may comprise a time synchronisation component in the form of a time synchronisation signal (TSS) and a link identifier in the form of a beam specific reference signal (BRS). The mobility access and reference signal MRS may be transmitted in a dedicated resource of the link, such as at a certain frequency and time slot.

Aspects of the disclosure are directed towards a link locating assisting device. A link locating assisting device may with advantage be implemented through the serving base station 14, i.e. the base station that serves the wireless terminal, and is a node in the mobile communication system 10. It should be realized that the link locating assisting device may be provided in another node than in the serving base station. However, if being provided in another network node it would be communicating with the serving base station. It may also be implemented through a cloud computer with which a network node communicates.

Figure 3:
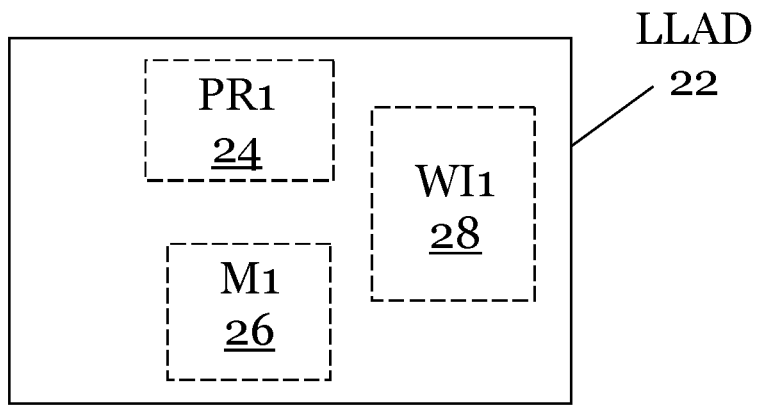
FIG. 3 shows a block schematic of a first realization of a link locating assisting device in the wireless communication network.

FIG. 3 shows a block schematic of a first way of realizing the link locating assisting device LLAD 22. It may be provided in the form of a first wireless interface WI1 28 together with a first processor circuit PR1 24 connected to a first program memory M1 26 comprising instructions for simplifying for the wireless terminal to locate candidate links. A wireless interface here comprises one or more radio circuits and one or more antennas. The first program memory 26 may comprise a number of computer instructions implementing the functionality of the link locating assisting device 22 relating to the simplifying for the wireless terminal to locate candidate target links and the first processor circuit 24 implements this functionality when acting on these instructions. It can thus be seen that the combination of first processor circuit 24, first memory 26 and optionally also the first wireless interface 28 are provided as the link locating assisting device 22.

Figure 4:
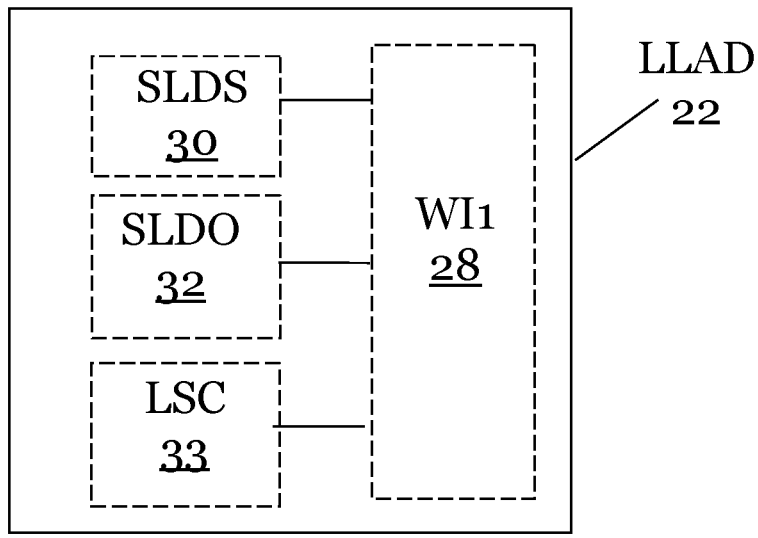
FIG. 4 shows a block schematic of a second realization of the link locating assisting device.

FIG. 4 shows a block schematic of a second way of realizing the link locating assisting device 22. The link locating assisting device 22 may comprise the first wireless interface WI1 28, a search limitation data sending unit SLDS 30, a search limitation data obtaining unit SLDO 32 and a link search control unit LSC 33. The search limitation data sending unit 30, the link search control unit 33 and optionally also the search limitation data obtaining unit 32 are here connected to the first wireless interface 28. It should be realized that a wireless interface is not strictly necessary in the link locating assisting device. It is needed in case the link locating assisting device is provided in a base station.

Figure 5:
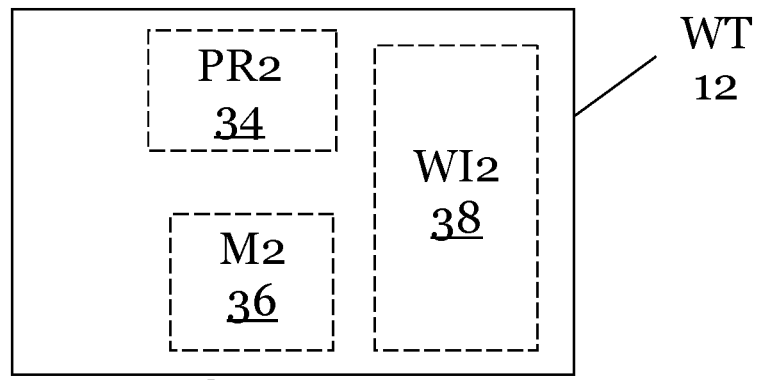
FIG. 5 shows a block schematic of a first realization of a wireless terminal.

FIG. 5 shows a block schematic of a first way of realizing some of the functionality of the wireless terminal WT 12. This functionality, which is used in relation to locating a set of candidate links, may be provided in the form of a second processor circuit PR2 34 connected to a second program memory M2 36. There is also a second wireless interface WI2 38. The second program memory 36 may comprise a number of computer instructions implementing the above-mentioned functionality of the wireless terminal 12 and the second processor 34 implements this functionality when acting on these instructions. It can thus be seen that the combination of second processor 34 and second memory 36 provides functionality related to the locating of a set of candidate links.

Figure 6:
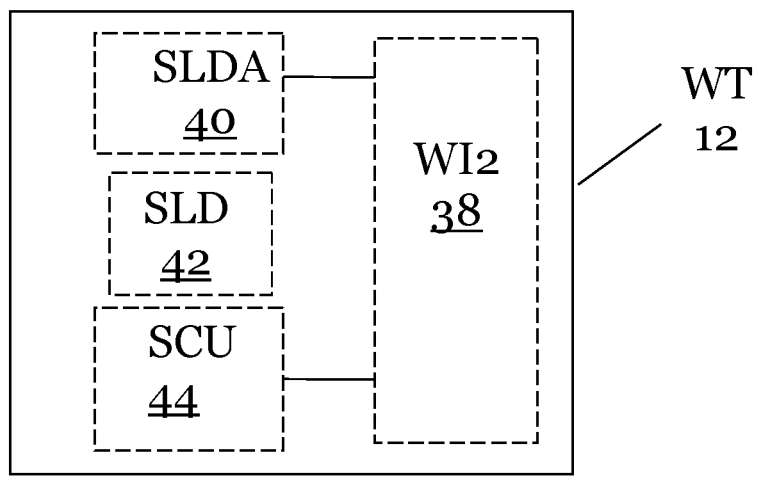
FIG. 6 shows a block schematic of a second realization of the wireless terminal.

FIG. 6 shows a block schematic of a second way of realizing the wireless terminal 12. The wireless terminal 12 comprises the second wireless interface WI2 38, a search limitation data acquiring unit SLDA 40, a search limitation determining unit SLD 42 and a search control unit SCU 44.

The units and blocks in FIGS. 4 and 6 may be provided as software blocks for instance as software block in a program memory, but also as a part of dedicated special purpose circuits, such as Application Specific Integrated Circuits (ASICs) and Field-Programmable Gate Arrays (FPGAs). It is also possible to combine more than one unit or block in such a circuit.

In the example in FIG. 1, the wireless terminal 12 is initially communicating with the serving base station 14 via the serving link SLK. Furthermore, during this communication, the wireless terminal 12 may be involved in a communication session, such as video or voice communication session. However, it may also be another type of session such as file transfer session.

As can be seen in FIG. 1 the wireless terminal 12 may be located at a border between the various links SLK, CLK1, CLK2 and CLK3. It may thereby need to be handed over from the serving link SLK to a target link. Sometimes this handover also involves the handover from the serving base station to a target base station.

The normal way of handling handover is through the wireless terminal 12 synchronising to a signal on a resource used by the target link, such as to the TSS of the MRS of the link, and measure quality parameters such as signal power, and signal to noise ratio etc. and report these to the serving link. Also similar measurements may be made with respect of the serving link. Then, if the communication quality is better at the target link, the wireless terminal is handed over.

The different base stations normally communicate according to a common signal structure, where the MRS is sent with a known timing and frequency. However, the structures are often not synchronised with each other. Furthermore, resources are limited in such systems and best used for various types of traffic. This means that it may be undesirable to use a whole resource for such a signal. It may be of interest to only use a part of a resource for a timing and frequency signal, as well as perhaps to only transmit it on demand, i.e. when an activity requiring the signal is to be performed by a wireless terminal. This means that the MRS may only be transmitted when it is needed.

The synchronising to a resource is in itself a slow process. The process may typically involve tuning to the resource, for instance tuning to the time slot and/or frequency of the resource used for the MRS. This process will most probably be further delayed in case the wireless terminal is unaware of the exact timing of the MRS.

Furthermore, also the frequency may differ somewhat from link to link, for instance due to individual local oscillator differences between the base stations. All in al this means that the process of locating the MRS for the different candidate links may be excessively long, as an excessive number of possible offset settings must be tested. If this happens in a handover situation it is for instance possible that the wireless terminal experiences degraded communication quality. Other consequences may comprise additional control signalling to initiate another session and a risk for radio link failure due to serving link signal deterioration.

There is thus a need for an improvement in the way a wireless terminal locates candidate links. Aspects of the invention are directed towards improving on the above-mentioned situation.

Figure 7:
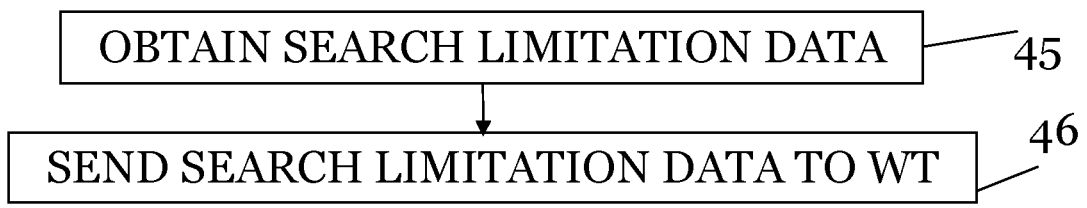
FIG. 7 shows a flow chart of method steps being performed in the link locating assisting device in a method for simplifying for a wireless terminal to locate candidate links according to a first embodiment.
Figure 8:
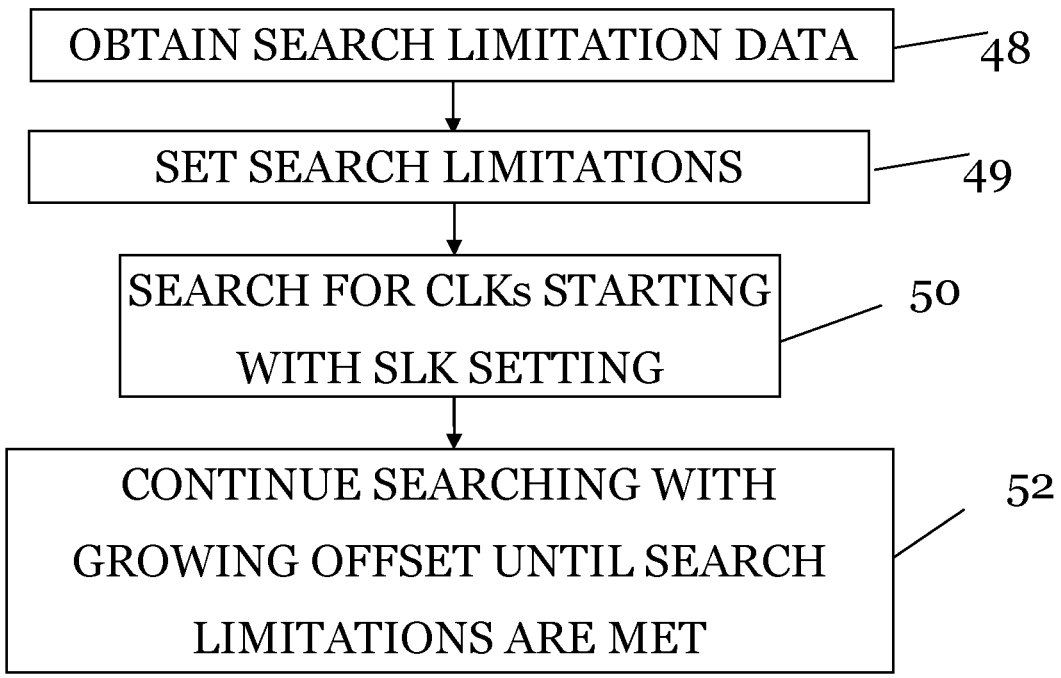
FIG. 8 shows a flow chart of a number of method steps being performed in the wireless terminal in a method for locating a set of candidate links according to the first embodiment.

A first embodiment will now be described with reference being made also to FIGS. 7 and 8, where FIG. 7 shows a flow chart of steps being performed in a method of assisting a wireless terminal in location a set of candidate links and being performed by the link locating assisting device and FIG. 8 shows a flow chart of a number of steps in a method for locating a set of candidate links and being performed by the wireless terminal 12.

In the following the link locating assisting device is implemented in the serving base station 14.

The first embodiment may be started through the link locating assisting device 22 and then with advantage the search limitation data obtaining unit 32 of the link locating assisting device 22 obtaining search limitation data concerning the wireless communication network 10, step 45. The search limitation data may comprise static or semi-static search limitation data. Static or semi-static search limitation data may comprise data about neighbouring links handled by other base stations, such as the link identifiers of the neighbouring base stations 16, 18 and 20. It may also comprise wireless network node deployment data, such as inter-site distances (ISD), i.e. the distances between the serving base stations, maximum allowed timing differences between the base stations, often denoted maximum permitted inter access node (AN) timing misalignment, maximum allowed frequency differences between the base stations, often denoted maximum permitted inter-AN frequency offset or local oscillator accuracy, the position of the wireless terminal in case it is stationary as well as the positions of various base stations. The maximum permitted inter-AN timing misalignment, which is thus the maximum allowed timing difference between possible target links for a wireless terminal, will in the following be termed maximum permitted internode misalignment and the maximum permitted inter-AN frequency offset will in the following be termed a maximum permitted internode frequency offset. Such static data may be obtained well in advance of the wireless terminal needing to locate candidate links. The term semi-static is used in order to indicate that at times some of the data may change. It is for instance possible that network nodes such as base stations are added or removed and thereby some of the above-mentioned search limitation data may also change.

The link search control unit 33 may at some point in time decide that the wireless terminal 12 needs to locate a number of candidate links. This may be done because the serving base station has decided that the handover may be necessary, for instance because of a low communication quality of an ongoing communication session. However, it should be realized that there may also exist other reasons for the link search control unit 33 of the link locating assisting device 22 determining that the wireless terminal 10 needs to locate a number of candidate links. This may be done if for instance needing to collect data on a link, such as information about the link or base station.

As an alternative it is possible that the search limitation data obtaining unit 32 obtains the static or semi-static search limitation data at the point in time when the link search control unit 33 determines that a link search should be made. Moreover, it is possible that the search limitation data obtaining unit 32 also obtains dynamic search limitation data, such as the position of the wireless terminal in case it is mobile, wireless terminal speed, angle of arrival (AoA) and the direction of downward link (DL) serving the wireless terminal. Such dynamic search limitation data concerning the wireless communication network may with advantage be received via the first wireless interface 28.

The search limitation data may be transferred from the link locating assisting device to the wireless terminal either periodically or event based.

It is transmitted based on an event, it may, as was indicated above, be transmitted based on a decision, such as handover decision. Therefore, once a decision has been made, i.e. a triggering event occurs, the search limitation data sending unit 30 may send the search limitation data SLD to the wireless terminal 12 in order to allow the wireless terminal 12 to use the search limitation data in obtaining search limitations to be used when searching for a set of candidate links, step 46. The search limitation data may in this case also be sent together with an instruction to the wireless terminal to also locate candidate links. This sending may also be performed via the first wireless interface 28 and the serving link SLK.

As was mentioned above, it is also possible that search limitation data is obtained before a search is needed. In the same way it is also possible that the static search limitation data is sent before a link search decision is needed, such as when the initial contact is set up between the wireless terminal 12 and the serving link SLK.

As was mentioned earlier, the search limitation data may be sent periodically by the link locating assisting device.

In order to limit the search for candidate links, the search limitation data acquiring unit 40 of the wireless terminal may obtain search limitation data, step 48. This obtaining may with advantage be the receiving of the previously described search limitation data SLD sent by the serving base station 14 via the serving link SLK. The search limitation data acquiring unit 40 in this case receives the SLD via the second wireless interface 38, which may, as was described earlier be periodic or event driven, such as by the wireless terminal 12 needing to locate candidate links, for instance because of the need for a handover, or when initially attaching to the serving link SLK. It is also possible that the search limitation data has been received from the wireless communication network at some previous point in time, for instance via previous Radio Resource Control (RRC) communication by the wireless terminal with another network node. However, it is also possible that the wireless terminal 12 itself has knowledge of some search limitation data. It may as an example have knowledge about the maximum permitted internode timing misalignment and/or the maximum permitted internode frequency offset. It may also have previously collected deployment statistics in the wireless communication network, which collection may have been made minutes or even hours earlier. The obtained search limitation data may thus also comprise information of which the wireless terminal itself is aware. Such search limitation data may then be obtained by the search limitation data acquiring unit 40 from a local memory, for instance from a Subscriber Identity Module (SIM) card.

Irrespective of how the search limitation data has been obtained, the search limitation determining unit 42 then sets search limitations for a link search based on the obtained search limitation data, step 49. In the case of the search limitation data being link identifiers, which may be provided in a candidate list of link identifiers, then these may be set as search limitations. In the case of network wireless network node deployment data, such as maximum permitted internode time misalignment, these may be used as a maximum allowed time offset component. In the case of received or known maximum permitted internode frequency offset, these may be set as a maximum allowed frequency offset component. The maximum allowed frequency component may be an offset that may be added or subtracted from the nominal frequency.

It is furthermore possible that the search limitation determining unit 42 processes the received search limitation data in order to determine the search limitations. If for instance the received search limitation data comprises an intersite distance, i.e. the distance between the serving base stations, it is possible that the search limitation determining unit 42 determines the maximum allowed time offset component based on the intersite distance. It is also possible to use base station positions as well as the wireless terminal position in order to determine a maximum time component of the offset.

It is also possible that a processing is made of a received maximum permitted internode frequency offset, which is a frequency offset defining a maximum permitted internode frequency. This may for instance be adjusted based on the determination that there is a Doppler shift.

The set search limitation may therefore be a maximum allowed timing adjustment, a maximum allowed frequency adjustment or the identities of known links provided by neighbouring base stations. Furthermore, it is also possible to apply one or more of these limitations at the same time. The frequency and time limitations may as an example be combined to form a search window within which a search is to take place. The frequency and/or time limitations may also be combined with a list of link identifiers.

Once the search limitations have been set, the search control unit 44 then performs a search for candidate links CLK1, CLK2, CLK3 using the second wireless interface 38.

The search, which is a search using offsets related to the serving link, is more particularly a search that starts with the current link setting used with the serving link SLK, step 50, and which then progresses outward or grows from there until the search limitations have been met, step 52.

It may more particularly involve searching for link identifiers of neighbouring links using the timing and frequency settings of the serving link and then continuing using offsets from these settings that grow. It is possible that the offset only has a time component, only a frequency component or both.

One way in which the search may be made is shown in table 1.

TABLE 1

|      | −4dt | −3dt | −2dt | −dt | 0 | +dt | +2dt | +3dt | +4dt |
|------|------|------|------|-----|---|-----|------|------|------|
| +3df |      |      |      |     |   |     |      |      |      |
| +2df |      |      | 16   | 15  | 14| 13  | 12   |      |      |
| +df  |      |      | 17   | 4   | 3 | 2   | 11   |      |      |
| 0    |      |      | 18   | 5   | 0 | 1   | 10   |      |      |
| −df  |      |      | 19   | 6   | 7 | 8   | 9    |      |      |
| −2df |      |      | 20   | 21  | 22| 23  | 24   | ...  |      |
| −3df |      |      |      |     |   |     |      |      |      |

For a current serving link timing T a timing grid step size dt and a frequency step size df, are used for making the offsets grow. The table shows the order of the searches made for the different offsets. The search may thus be conducted in a configuration that gradually expands around the serving link t/f settings until either the known links in the list are found or the maximum offset is reached.

It can thus be seen that an initial search is made with offset 0, i.e. the settings of the serving link. Thereafter, in the example of table 1, follows a first search with time offset+1 df and no frequency offset. This is in turn followed by a second search with the same time offset and a frequency offset+1 df. Then follows a third search with the time offset 0 and frequency offset+df. Thereafter there is a fourth search with a time offset−dt and a frequency offset+df, which is followed by a fifth search with time offset−dt and frequency offset 0, a sixth search with time offset−dt and frequency offset−df, etc. There is finally shown a 24$^{th}$ search with a timing offset component setting of +2dt and a frequency offset component setting of −2df. This is just one example, other possible orders following the same principle are possible.

The link search with growing offsets are thus continued until the search limitations are met. If the search limitations are a number of known links, then the search is continued until the identifiers of these known links have been found. If, however the search limitations are a search window or search range limitations, such as a maximum frequency offset and/or a maximum time offset, then the search is performed until the maximum has been reached. In the example of table 1, the maximum time offset may for instance be 2dt and the maximum frequency offset 2df, which means that the search would be stopped at the 24$^{th}$ search where the offset−2df and +2dt are used and when both signs of the offset have been exhausted.

It can be seen that a specific offset component is applied with a positive sign and with a negative sign.

The links that are identified when the search is finished may then be investigated for performing a handover.

It can in this way be seen that candidate links may be located faster than in conventional searches. This may be achieved through the search being limited to the known links or through a search window size being limited by the search limitations, such as being limited to the time and frequency offsets that are feasible for the neighbouring links.

Thereby it may be possible to avoid problems such as loss of contact with a link before handover can be made.

Furthermore, the number of searches are typically reduced compared with the use of a default search window setting, which is typically a worst use case setting.

Another advantage is that the computational load associated with the link search and detection process in the wireless terminal may be reduced. This also means that the energy consumed by the wireless terminal in locating links is reduced. Providing the candidate list and applying the outwards search principle, the search may be completed quickly compared to a full search. Using additional information about the relevant search window being narrower than the worst case configuration, the search effort is further reduced and so is the associated delay.

Additionally, early termination of the search procedure may also allow faster reporting in fully non-synchronized deployments, thus reducing the Handover (HO) latency in beam-based systems with lower HO margins.

It has here to be stressed that the scheme shown in table 1 is merely an example and that several variations of it are possible. It is for instance possible that the opposite direction is employed compared to table 1, so that the second search that follows after the first search at 0 df and +dt is +dt and −df. It is also possible that the first search instead is made at 0 df and −dt followed by a second search at +df and −dt or at −df and −dt. It is likewise possible that the first search is made at 0 dt and +df or at 0 dt and −df.

Figure 9:
FIG. 9 shows a list of candidate links for use in a second embodiment.
Figure 10:
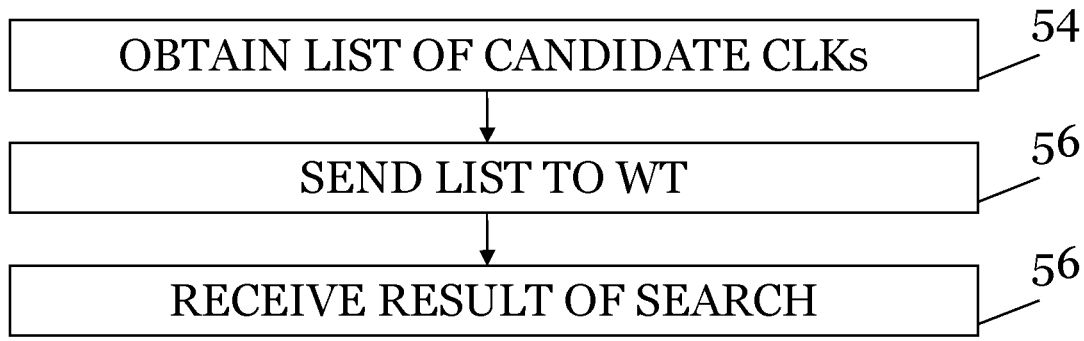
FIG. 10 shows flow chart of method steps being performed in the link locating assisting device in the method for simplifying for a wireless terminal to locate candidate links according to the second embodiment.
Figure 11:
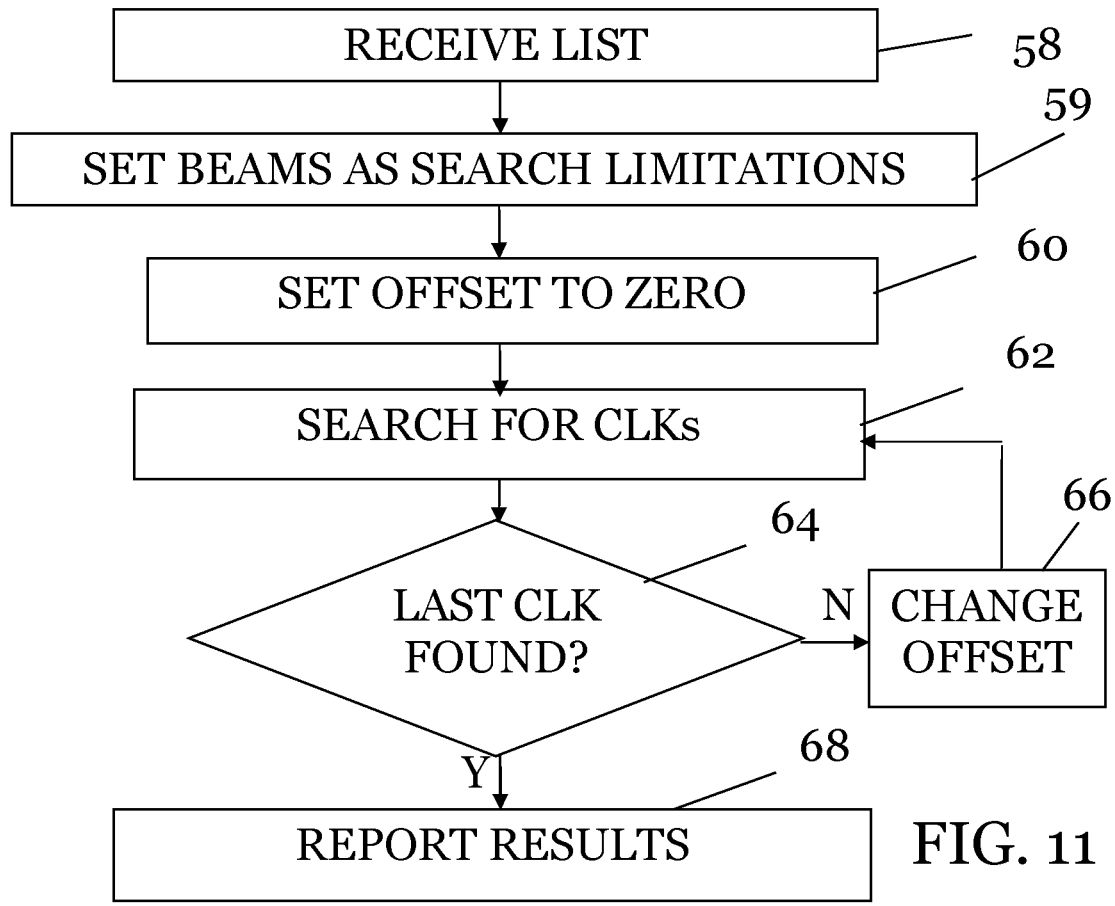
FIG. 11 shows a flow chart of a number of method steps being performed in the wireless terminal in the method for locating a set of candidate links according to the second embodiment.

Now a second embodiment will be described for a case where the links are beams and the search is limited by the identities of the beams that are neighbours to a serving beam. In this case reference is made to FIGS. 9, 10 and 11, where FIG. 9 shows a list L of candidate link references LR1, LR2 and LR3, which are thus beam references, FIG. 10 shows a flow chart of method steps being performed in the link locating assisting device 22 in a method for simplifying for a wireless terminal to locate candidate beams and FIG. 11 shows a flow chart of method steps being performed in the wireless terminal in a method for locating a set of candidate beams.

In this embodiment, the search limitation data obtaining unit 32 of the link locating assisting device 22 obtains search limitation data in the form of the list L of a set of candidate beams, step 54. This may be done through fetching the list L from a memory or a database in the system. The list L comprises the identities L1, L2 and L3 of the neighbouring beams, i.e. the candidate beams CLK1, CLK2 and CLK3, where the beam references may be provided in the form of Beam Specific Reference signal (BRS). The list L is thereby a list of link identifying data in the form of beam identifying data.

The link search control unit 33 may decide that the wireless terminal 12 needs to locate a number of candidate beams. This may be done because the serving base station has decided that a handover may be necessary, for instance because of a low communication quality of a communication session involving the wireless terminal 12. In the new beam-based mobile access networks, such as NR/NX (or any other 5G radio standard) the beam search process is preferably triggered by the link quality reduction of the wireless terminal.

Once this decision has been made, the search limitation data sending unit 30 may send the list, which may comprise the beam references LR1, LR2 and LR3, i.e. the identifiers identifying the beams transmitted by the first, second and third candidate target base stations 16, 18 and 20, step 56. If the search limitation data is sent in relation to a handover, it may also be sent together with an instruction to the wireless terminal to also try to locate candidate beams. This sending may also be performed via the first wireless interface 28 and the serving beam SLK.

In one variation of the second embodiment the wireless terminal 12 can be informed about the list of potential neighbour MRSs via an established Radio Resource Control (RRC) message concerning an RRC Connection e.g. an RRC Connection Reconfiguration. This message can either be transmitted to the wireless terminal when an RRC connection is established or upon the detection of the need of a mobility preparation procedure e.g. when link/beam degradation is detected by the serving base station 14 and the message is sent as a response for that.

In another variation of the second embodiment the wireless terminal receives via system information (transmitted over a common channel) a list of neighbour beam identities valid within a pre-defined Radio Access Network (RAN) area (possibly defined in the same system information).

In the example described above the list was sent based on the occurrence of an event. As an alternative it may also be sent periodically.

The search limitation data acquiring unit 40 of the wireless terminal 12 thus receives the list L via the second wireless interface 38, step 58, which may be at the time a search is needed or in advance of such a search.

The search limitation determining unit 42 then sets search limitations for a beam search based on the obtained search limitation data, which in this case is thus based on the beam identifying data.

In this embodiment it sets the links or beams as limitations, step 59. This means that as soon as all the beam identifiers LR1, LR2, LR3 of the beams in the list L have been found, then the search is to be stopped.

Once the search limitations have been set the search control unit 44 then performs a search for candidate beams using the second wireless interface 38.

The search is more particularly a search that starts with the current beam setting used with the serving beam SLK. There is thus a starting timing setting, such as a timing advance setting, and a frequency setting that was used for the serving beam. Therefore, the search control unit 44 initially sets the offset to zero, step 60.

Thereafter the search control unit 44 searches for the candidate beams using the wireless interface, step 62. It then investigates if the last beam in the list has been found. If the last beam has been found, step 64, the search control unit 44 stops searching, while if the last beam has not been found, step 64, it changes offset, step 66. Thereafter the search control unit orders a new search to be made, step 62, which is made using the new offset.

This is again followed by an investigating of if all beams have been found. The steps in the loop are repeated until all the beams in the list L have been found. The search thus progresses outward or grows with an offset from the serving beam settings until the search limitations have been met, which in this case thus involves stopping the search when the candidate beams identified in the beam identifying data have been found.

In one variation of the second embodiment, where the offset has a frequency component and a time component, the search in principle follows the same procedure as shown in table 1.

In this case the search control unit 44 more particularly searches for beam identifiers of beams using the timing and frequency settings of the serving beam and then continues using offsets from these settings that grow.

The beam search with growing offsets are thus continued until all beam identifiers have been found.

Put differently, the wireless terminal is provided a list of candidate beam identities (or corresponding MRS signals, e.g. BRS sequences) to search for e.g. when the wireless terminal enters RRC Connected state (e.g. RRC Connected Reconfiguration message) or when some beam degradation event occurs.

The wireless terminal 12 then starts with searching for all candidate beam BRS at current serving beam time and frequency synchronization setting, i.e, the settings of the serving beam SLK. If some beams in the list are not found at that timing, the wireless terminal continues searching for mobility signals along the timing and frequency offset synchronization grid shown in table 1 using time-domain correlation of TSS. The search is performed "outwards" from the current timing and frequency setting. For each found TSS timing and frequency, the remaining BRS are tested. Once a BRS in the search list is identified, it is removed from further searches. The search is ended once all beams in the candidate list L are detected and measured, or the maximal predetermined or default search window is exhausted.

As shown above, it is possible that the search is only performed in the time domain. In which case the search may progress according to the sequence T+dt, T−dt, T−2dt, T+2dt, T+3dt, etc.

Alternatively, the search sequence may accommodate special hardware designs that are optimized for sliding-window time correlation processing, for instance according to the principles laid out in US 2001/0040933.

In that case, two TSS search correlators may be configured; one in the forward and one in the backwards direction. The correlators are advanced one step at a time in each direction to test T±dt, T±2dt, T±3dt, etc.

Alternatively, the offset change may only be performed in the frequency domain, in case non-negligible frequency offset between the individual beams may be expected.

The located beams and the offsets used when locating them with may then be reported by the search control unit 44 to the link locating assisting device 22, step 68, and the reported beams and offsets are then received by the search limitation data obtaining unit, step 56. This may be used in refining future lists. The wireless terminal thereby informs the serving network node 14 about the offsets for which candidate beams CLK1, CLK2, CLK3 have been located with the used search limitations.

It is furthermore possible that the serving base station 14 orders measurements to be made in order to effectuate a handover.

In addition to the previously known advantages of providing the candidate list L to the wireless terminal (reduced complexity due to reduced beam identity search space and lower BLock Error Rate (BLER) due to fewer candidates being tested) another advantage is added—the ability to stop the search much earlier in cases when the inter-beam time/frequency differences are small.

Figure 12:
FIG. 12 shows wireless network node deployment data for use in a third embodiment.
Figure 13:
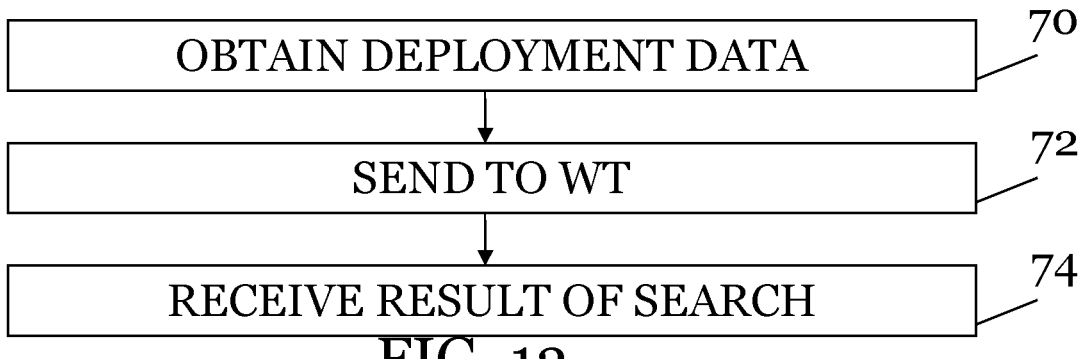
FIG. 13 shows a flow chart of method steps being performed in the link locating assisting device in the method for simplifying for a wireless terminal to locate candidate links according to the third embodiment.
Figure 14:
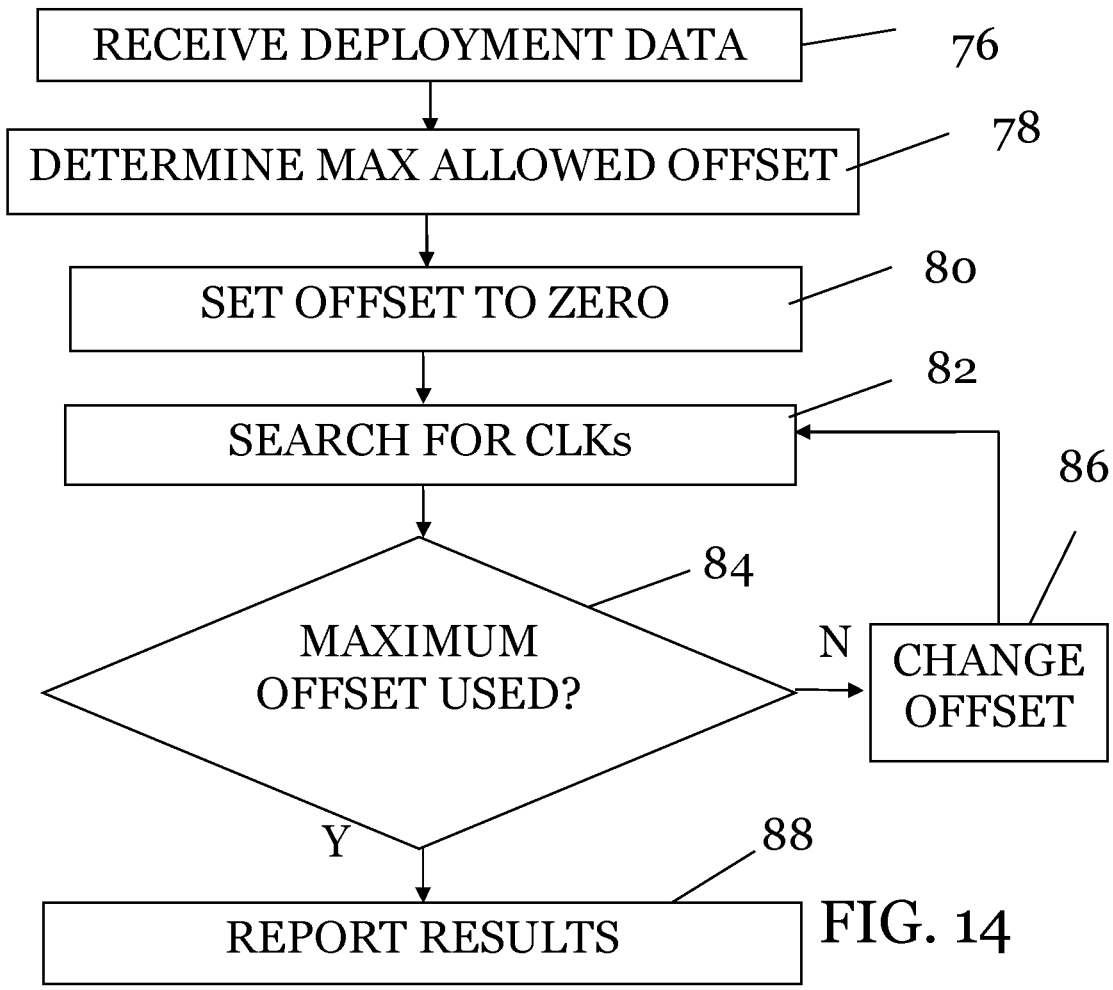
FIG. 14 shows a flow chart of a number of method steps being performed in the wireless terminal in the method for locating a set of candidate links according to the third embodiment.

Now a third embodiment will be described with reference being made to FIGS. 12, 13 and 14, where FIG. 12 shows wireless network node deployment data WNNDD, FIG. 13 shows a flow chart of method steps being performed in the link locating assisting device in the method for simplifying for a wireless terminal to locate candidate links and FIG. 14 shows a flow chart of method steps being performed in in the wireless terminal in the method for locating a set of candidate links.

The third embodiment may be started through the link locating assisting device 22 and then with advantage the search limitation data obtaining unit 32 of the link locating assisting device 22 obtaining static or semi-static and possibly also dynamic search limitation data, step 70, where the static data comprises wireless network node deployment data WNNDD, such as network configurations like intersite distances ISD, i.e. the distances between the serving base stations, maximum permitted internode timing misalignment (INTM) and maximum permitted internode frequency offset (INFO). The wireless network node deployment data may also comprise position data such as the positions of the base stations. Moreover, it is possible that the search limitation data obtaining unit 32 also obtains dynamic search limitation data, such as measurement data like the position of the wireless terminal 12 in case it is mobile, wireless terminal speed, angle of arrival (AoA) and direction of downward link serving the wireless terminal. Dynamic data may with advantage be received via the first wireless interface 28.

The collected data is to be used for determining a maximum allowed timing offset and/or a maximum allowed frequency offset component. If only static data is available, the maximum allowed timing offset component may be determined by the search limitation data obtaining unit 32. This may then be used by the wireless terminal 12 as a search limitation. Also in case dynamic data is used the maximum allowed timing offset component may be determined by the search limitation data obtaining unit 32. In this case wireless terminal may report for instance position and speed to the search limitation data obtaining unit 32. Alternately this unit may determine these parameters based on other information such as triangulation.

As an alternative the search limitations may be determined by the wireless terminal based on processing of the collected data by the link locating assisting device 22.

The wireless terminal may thus determine search limitations, such as maximum allowed time offset components based on inter-site distances, the position of serving and other base stations and the own position.

The wireless terminal may also adjust the maximum permitted internode timing alignment in order to obtain the maximum allowed timing component or time offset component. It may for instance determine a clock instability timing offset element based on the known inaccuracy of the local oscillators used in the different base stations and combine this with the maximum permitted internode timing misalignment in order to obtain the maximum allowed timing component.

As in the previous embodiments, the wireless network node deployment data WNNDD may be sent periodically or triggered by a decision.

If it is sent triggered by a decision, then once the decision has been made, the search limitation data sending unit 30 may send the wireless network node deployment data WNNDD to the wireless terminal 12 using the first wireless interface 28, step 72, which may be the obtained deployment data or the determined maximum allowed timing and/or frequency offset components.

The serving base station 14 may thus inform the wireless terminal 12 about deployment parameters that determine the worst-case timing and/or frequency misalignment between possible target beams in the mobility measurement process.

Regarding time alignment, such parameters may include the maximum permitted internode timing misalignment and the ISD. Those may be used to derive a worst-case timing offset Tmax at the wireless terminal between the serving and candidate beam signals. Regarding frequency alignment, such parameters may include the maximal permitted internode frequency offset which may be used to derive a worst-case frequency offset Fmax.

In one variation of the third embodiment, the timing alignment-related data is signalled as categories. Some possibilities for access node synchronization are "tight alignment", loose alignment", "no alignment (non-synchronized NW)", etc. and for intersite distance (ISD) "small ISD", "large ISD", "macro layer", "pico layer", etc. A tight alignment thus signals a small sized offset limitation, a loose alignment at large sized offset limitation, while no alignment may signal that no offset limitation is to be used. A pico layer may on the other hand signal a small intersite distance while a macro layer may signal a large intersite distance. Alternatively, the serving base station 14 may signal the actual timing tolerance and ISD values. The ISD may be provided as a mean ISD (e.g. a weighted ISD average of current node's neighbour nodes, possibly complemented by a variance measure or the maximum and minimum ISDs to the neighbour nodes in order to indicate how much the wireless terminal can rely on the average ISD).

The time alignment and maximum permitted internode frequency offset can be reported as part of the deployment data from the serving base station 14 to the wireless terminal 12. In one variation, this deployment data is common for all access node configurations describing the permitted internode offsets. In another variation, the deployment data is provided for each pair of access nodes, or between groups of access nodes. The deployment data can be separated between timing and frequency offsets. Reporting of deployment data can be done in a similar manner as the "quasi co-location" (QCL) in 3GPP Technical Specification 36.211, V13.0.0, section 6.2.1, but extended to include timing and frequency offset configurations.

If the wireless terminal is moving, the deployment data may be signalled to the wireless terminal frequently to match the wireless terminal-specific area or layer of the network, or signalled once at wireless terminal registration to match the entire network.

Furthermore, the serving base station 14 may also signal the current node position in combination with the current AoA or the direction of the DL beam serving the wireless terminal, which could aid the position estimation of the wireless terminal even further, or the serving base station may signal a complete estimate of the position of the wireless terminal. The current timing advance value, i.e. the timing advance setting of the serving base station 14 may also provide input to this position estimation. If the wireless terminal 12 is moving, the deployment data may be signalled to the wireless terminal frequently to match the specific area or layer of the network that the wireless terminal is currently found in, or signalled once at wireless terminal registration to match the entire network.

After the data is received by the search limitation data acquiring unit 40, step 76, the search limitation determining unit 42 of the wireless terminal 12 determines a maximum allowed offset based on the received wireless network node deployment data, step 78, which may be done through setting the maximum permitted internode timing misalignment and/or the maximum permitted internode frequency offset as maximum allowed timing component and maximum allowed frequency component of the maximum offset, where the maximum permitted internode frequency offset is an element, and in some cases case the only element, of the maximum allowed frequency offset.

Alternatively, the search limitation determining unit 42 may process the data received from the link locating assisting device 22.

Here it is possible that the search limitation determining unit 42 autonomously estimates the position of the wireless terminal 12 in order to start a timing search with a line of sight assumption to the serving node 14, where the serving node position, current AoA or the direction of the DL link/beam serving the wireless terminal may be used to aid the wireless terminal when estimating its own position. The current timing advance value of the serving link SLK may also provide input to this position estimation. This may then be used by the search limitation determining unit 42 for starting its timing search with line of sight assumption, followed by stepping outwards. The deployment data and possibly also the dynamic position data may therefore be used.

The serving base station 14 may also signal its own position. Furthermore, the serving base station 14 may also signal the current AoA and the direction of the DL beam serving the wireless terminal. Alternatively, the serving base station 14 may signal a complete estimate of the wireless terminal position.

The maximum allowed frequency component is based on the maximum permitted internode frequency offset, which as mentioned earlier, may involve the maximum frequency offset component being set as the maximum permitted internode frequency offset. This may be sufficient if the wireless terminal 12 is stationary.

A wireless terminal may thus be preconfigured for stationary use, i.e. no movements. Such use cases include many sensors for MTC (Machine Type Communications). For these wireless terminals, the frequency offset search might be limited to "maximum permitted internode frequency offset" as reported by the serving base station. However, in case the wireless terminal is moving, it may experience a Doppler shift, which may require an increase of the maximum allowed frequency offset component. The search limitation determining unit 42 may thus determine a movement based frequency offset element of the maximum allowed frequency through identifying a Doppler shift.

Regarding frequency alignment, such parameters may include the maximum permitted internode frequency offset element. Together with a Doppler spread or Doppler shift estimate element computed at the wireless terminal, it may be used to derive the worst-case frequency offset Fmax at the wireless terminal between the serving and candidate beam signals. The search limitation determining unit 42 may thus determine the maximum allowed frequency component based on the maximum permitted internode frequency offset may therefore in this case involve determining the maximum allowed frequency offset as the reported maximum permitted internode frequency offset plus the frequency change of a Doppler shift measured at the wireless terminal.

After the maximum allowed time offset component and/or maximum allowed frequency offset component have been determined, the search control unit 44 of the wireless terminal 12 may then search for the links using the previously described principles. Therefore, the search control unit 44 sets the offset to zero, step 80.

Thereafter it searches for the candidate links using the second wireless interface 38, step 82, and reporting any links or beams that have been found. The search control unit 44 then investigates if the maximum offset has been reached. If the maximum offset has been reached, step 84, it stops searching, while if the maximum offset has not been reached, step 84, it changes offset, step 86. Thereafter the search control unit 44 orders a new search to be made, step 82, which is made using the new offset.

The steps in the loop are then repeated until the maximum allowed offset has been reached. The change of offset is, just as was described earlier, made in a growing fashion out from the settings of the serving beam SLK.

The result may finally be reported to the link locating assisting device 22, step 88, which thereby receives them, step 74. It is also possible to store the obtained offsets for later use.

The default search window is typically defined at wireless terminal design time, and may depend on the frequency band.

The various embodiments may be used in a number of ways in addition to those already described.

In one variation, in the absence of deployment parameter signalling from the network, the wireless terminal may store the statistical distribution of previously found timing and/or reference offsets over time. It can then limit future searches to the window that contains all (or some percentage of, e.g. 99%) of the previous offsets.

As was described above it is also possible to combine the second and third embodiments. In this case the search is ended for the search limitation of the two types of search limitations that is fulfilled first.

In a variation of this embodiment combination, besides or in addition to ISD information, the serving base station signals the positions of the nodes (in particular the positions of the antenna sites in case they differ from the position of the actual nodes) responsible for the respective beams in the candidate beam list as a part of the wireless network node deployment data. It is also possible that the ISD is provided per beam in the candidate beam list.

There are exist a number of examples where it may be of interest to have different maximum permitted internode timing misalignments and different maximum permitted frequency offsets and where there would thus be of interest to inform a wireless terminal about these. Such informing would also with advantage be event triggered.

It is for instance possible that there are different synchronization domains in the wireless network, where the internode synchronisation is more accurate within the domain than between two nodes belonging to different domains. The maximum permitted frequency offset would thus be lower for the nodes belonging to the same domain than for those that belong to different domains. For instance, if the source and candidate target node(s) belong to different synchronisation domains, then the source node would inform the wireless terminal of a larger potential synchronisation difference than if the source and candidate node(s) belong to the same synchronisation domain.

Likewise, it is possible that there are different types of nodes in the network with different synchronization requirements, e.g. simple low-power nodes may have more relaxed requirements on the synchronization accuracy/stability in order to enable using low-cost components for such nodes. Then, if the candidate (or the source) node is a node with lower synchronisation accuracy/stability, the source node would inform the wireless terminal of a larger potential synchronisation difference, i.e. a higher maximum permitted frequency offset, than if the source and candidate node both adhere to stricter synchronisation requirements. And if both the source and the candidate node have relaxed sync requirements, then an even larger potential synchronisation difference would be indicated to the wireless terminal.

It is also possible to provide the wireless terminal with an exact inter-site distance between a source node and a candidate node (i.e. the distance between the respective antenna sites), in order to give the wireless terminal a better possibility to estimate the impact of propagation delay than a general average inter-site distance measure.

It is furthermore possible to provide the wireless terminal with the position of the candidate nodes (i.e. the position of the antenna site) (and possibly the position of the antenna site of the source node too), in order to give the wireless terminal even better possibilities to estimate the impact of the propagation distance, e.g. by comparing its own position with that of the antenna site of the candidate node. The wireless terminal could obtain its own position from a GPS receiver or any other positioning means, including receiving a position estimate from the source node or using the Direction of Arrival/Direction of Transmission from/towards the source and the timing advance together with the position of the antenna site of the source node.

Figure 15:
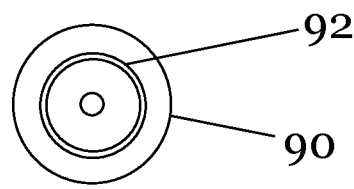
FIG. 15 shows a computer program product comprising a data carrier with computer program code for implementing the functionality of the link locating assisting device.

The computer program code of the functionality for simplifying for the wireless terminal to locate candidate links in the link locating assisting device 22 may be in the form of computer program product for instance in the form of a data carrier, such as a CD ROM disc or a memory stick. In this case the data carrier carries a computer program with the computer program code, which will implement the functionality of the above-described link locating assisting device. One such data carrier 90 with computer program code 92 is schematically shown in FIG. 15.

Figure 16:
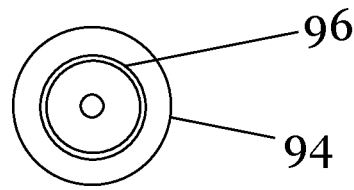
FIG. 16 shows a computer program product comprising a data carrier with computer program code for implementing functionality of the wireless terminal.

Also the computer program code of the functionality for locating a set of candidate links in the wireless terminal 12 may be in the form of computer program product for instance in the form of a data carrier, such as a CD ROM disc or a memory stick. In this case the data carrier carries a computer program with the computer program code, which will implement the functionality. One such data carrier 94 with computer program code 96 is schematically shown in FIG. 16.

The link locating assisting device may also be considered to comprise: means for obtaining search limitation data concerning the wireless communication network, and means for sending the search limitation data to the wireless terminal for use in obtaining limitations for limiting a search for a set of candidate links.

The link locating assisting device may be further considered to comprise means for receiving information from the wireless terminal about located candidate links and the offsets used by the wireless terminal when locating them.

The link locating assisting device may further be considered to comprise means for instructing the wireless terminal to locate candidate target links.

The wireless terminal may in turn be considered to comprise means for obtaining search limitation data, means for setting limitations for a link search based on the search limitation data, means for searching for candidate links starting with a current link search setting used with the serving link and means for continuing searching for candidate links with an offset from the current link search setting that grows with every search until the search limitations have been met.

The wireless terminal may also be considered to comprise means for informing the serving network node about the offsets for which candidate links have been located with the used search limitations.

When the search limitation comprises a maximum allowed offset the means for continuing searching for candidate links with an offset from the current link search setting that grows with every search until the search limitations have been met comprises means for ending the search in case the maximum allowed offset is reached.

The means for obtaining search limitation data may furthermore comprise means for receiving search limitation data from the wireless communication network.

The means for receiving search limitation data may further comprise means for receiving link identifying data, the means for setting search limitations may comprise means for setting candidate links identified in the link identifying data as search limitations and the means for continuing searching until the search limitations have been met may comprise means for stopping the search when the candidate links identified in the link identifying data have been found.

The means for obtaining search limitation data may furthermore comprise means for receiving wireless network node deployment data and the means for setting search limitations for a link search may comprise means for determining the maximum allowed offset based on the received wireless network node deployment data.

The wireless terminal may further be considered as comprising means for determining a movement based frequency offset element of the maximum allowed frequency component through identifying a Doppler shift.

The wireless terminal may further be considered as comprising means for determining a clock instability timing offset element of the maximum allowed timing component The wireless terminal may also be considered as comprising means for autonomously obtaining search limitation data.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following claims.

The invention claimed is:

1. A wireless terminal for locating a set of candidate links in a wireless communication network when communicating with a serving network node via a serving link, the wireless terminal comprising a processor circuit acting on computer instructions whereby said wireless terminal is operative to:
   obtain search limitation data that defines limits on a link search for a set of candidate links with respect to one or more time offsets and/or frequency offsets from a current link search setting;
   set limitations for the link search based on the search limitation data;
   search for candidate links starting with a current link search setting used with the serving link, the current link search setting being a timing and/or frequency setting of the serving link; and
   continue searching for candidate links with an offset from the current link search setting, wherein the offset is a time offset or a frequency offset that grows until the search limitations have been met.

2. The wireless terminal of claim 1, wherein the offset comprises a time component.

3. The wireless terminal of claim 1, wherein the offset comprises a frequency component.

4. The wireless terminal of claim 1, wherein a specific offset component is applied with a positive sign and with a negative sign.

5. The wireless terminal of claim 1, being further operative to inform the serving network node about the offsets for which candidate links have been located with the used search limitations.

6. The wireless terminal of claim 1, wherein the search limitations comprise a maximum allowed offset and the search is ended in case the maximum allowed offset is reached.

7. The wireless terminal of claim 1, which when obtaining search limitation data is operative to receive search limitation data from the wireless communication network.

8. The wireless terminal of claim 7, which when receiving search limitation data is operative to receive link identifying data, when setting search limitations is operative to set candidate links identified in the link identifying data as search limitations and when continuing searching until the search limitations have been met is operative to stop the search when the candidate links identified in the link identifying data have been found.

9. The wireless terminal of claim 7, wherein the search limitations comprise a maximum allowed offset and the search is ended in case the maximum allowed offset is reached, and wherein the wireless terminal is operative to receive search limitation data from the wireless communication network and is operative to receive wireless network node deployment data, and, when setting search limitations for a link search, is operative to determine the maximum allowed offset based on the received wireless network node deployment data.

10. The wireless terminal of claim 9, wherein the offset comprises a frequency component, and wherein the wireless network node deployment data comprises a frequency offset element defining a maximum permitted internode frequency and the maximum allowed offset comprises a maximum allowed frequency component that is based on said frequency offset element.

11. The wireless terminal of claim 10, the wireless terminal being further operative to determine a movement based frequency offset element of the maximum allowed frequency component through identifying a Doppler shift.

12. The wireless terminal of claim 9, wherein the offset comprises a time component, and wherein the wireless network node deployment data comprises a timing offset element defining a maximum allowed timing offset and the maximum allowed offset comprises a maximum allowed timing component that is based on said timing offset element.

13. The wireless terminal of claim 12, the wireless terminal being further operative to determine a clock instability timing offset element of the maximum allowed timing component.

14. The wireless terminal of claim 1, which when obtaining search limitation data is operative to autonomously obtain search limitation data.

15. A method for locating a set of candidate links in a wireless communication network by a wireless terminal when communicating with a serving network node via a serving link, the method being performed by the wireless terminal and comprising the steps of:

obtaining search limitation data that defines limits on a link search for a set of candidate links with respect to one or more time offsets and/or frequency offsets from a current link search setting, the current link search setting being a timing and/or frequency setting of the serving link;

setting search limitations for the link search based on the search limitation data;

searching for candidate links starting with a current link setting used with the serving link;

continuing searching for candidate links with an offset from the current link setting, wherein the offset is a time offset or a frequency offset that grows until the search limitations have been met.

16. The method of claim 15, wherein the search limitations comprise a maximum allowed offset and the search is ended in case the maximum allowed offset is reached.

17. The method of claim 15, wherein the obtaining of search limitation data comprises receiving search limitation data from the wireless communication network.

18. The method of claim 17, wherein the obtaining of search limitation data comprises receiving link identifying data, the setting of search limitations comprises setting candidate links identified in the link identifying data as search limitations and the continuing searching for candidate links until the search limitations have been met comprises stopping the search when the candidate links identified in the link identifying data have been found.

19. The method of claim 17, wherein the search limitations comprise a maximum allowed offset and the search is ended in case the maximum allowed offset is reached, and wherein the receiving of search limitation data comprises receiving wireless network node deployment data and the setting of search limitations comprises determining the maximum allowed offset based on the received deployment data.

20. The method of claim 19, wherein the wireless network node deployment data comprises a frequency offset element defining a maximum permitted internode frequency and the maximum allowed offset comprises a maximum allowed frequency component that is based on said frequency offset element.

21. The method of claim 20, further comprising determining a movement based frequency offset element of the maximum allowed frequency component through identifying a Doppler shift.

22. The method of claim 15, wherein the obtaining of search limitation data comprises autonomously obtaining search limitation data.

23. A non-transitory computer-readable medium comprising, stored thereupon, a computer program for locating a set of candidate links in a wireless communication network by a wireless terminal when communicating with a serving network node via a serving link, the computer program comprising computer program code that, when run in a wireless terminal, causes the wireless terminal to:

obtain search limitation data that defines limits on a link search for a set of candidate links with respect to one or more time offsets and/or frequency offsets from a current link search setting, the current link search setting being a timing and/or frequency setting of the serving link;

set search limitations for the link search based on the search limitation data;

search for candidate links, starting with a current link search setting used with the serving link;

continue searching for candidate links with an offset from the current link search setting, wherein the offset is a time offset or a frequency offset that grows until the search limitations have been met.

24. A link locating assisting device in a wireless communication network for simplifying for a wireless terminal to locate candidate links when communicating with a serving network node via a serving link, the device comprising a processor circuit acting on computer instructions whereby said link locating assisting device is operative to:
- obtain search limitation data concerning the wireless communication network, wherein the search limitation data defines limits on a link search for a set of candidate links with respect to one or more time offsets and/or frequency offsets from a current link search setting, the current link search setting being a timing and/or frequency setting of the serving link; and
- send said search limitation data to the wireless terminal for use in obtaining limitations for limiting the search for the set of candidate links.

25. The link locating assisting device of claim 24, wherein the search limitation data comprises candidate link identifying data.

26. The link locating assisting device of claim 24, wherein the search limitation data comprises wireless network node deployment data for use by the wireless terminal to set a maximum allowed offset in locating candidate links using offsets related to the serving link.

27. The link locating assisting device of claim 26, wherein the wireless network node deployment data comprises a network configuration that comprises one or both of: intersite distance and maximum permitted internode timing misalignment.

28. The link locating assisting device of claim 26, wherein the wireless network node deployment data comprises a maximum permitted internode frequency offset for use by the wireless terminal to set the maximum allowed offset.

29. The link locating assisting device of claim 24, wherein the search limitation data comprises measurement data, the measurement data comprising at least one of wireless terminal position, wireless terminal speed, angle of arrival and direction of downward link serving the wireless terminal.

30. The link locating assisting device of claim 24, being further operative to receive information from the wireless terminal about located candidate links and the offsets used by the wireless terminal when locating them.

31. The link locating assisting device of claim 24, being further operative to instruct the wireless terminal to locate candidate target links.

32. A method of simplifying for a wireless terminal to locate candidate target links in a wireless communication network when communicating with a serving network node via a serving link, the method being performed by a link locating assisting device and comprising:
- obtaining search limitation data concerning the wireless communication network, wherein the search limitation data defines limits on a link search for a set of candidate links with respect to one or more time offsets and/or frequency offsets from a current link search setting, the current link search setting being a timing and/or frequency setting of the serving link; and
- sending said search limitation data to the wireless terminal for use in obtaining limitations for limiting the search for the set of candidate links.

33. The method of claim 32, wherein the search limitation data comprises candidate link identifying data.

34. The method of claim 32, wherein the search limitation data comprises wireless network node deployment data for use by the wireless terminal to set a maximum allowed offset in locating candidate links using offsets related to the serving link.

35. The method of claim 34, wherein the wireless network node deployment data comprises a network configuration that comprises one or both of: intersite distance and maximum permitted internode timing misalignment.

36. The method of claim 34, wherein the wireless network node deployment data comprises a maximum permitted internode frequency offset for use by the wireless terminal to set the maximum allowed offset.

37. The method of claim 34, wherein the search limitation data comprises measurement data, the measurement data comprising at least one of wireless terminal position, wireless terminal speed, angle of arrival and direction of downward link serving the wireless terminal.

38. A non-transitory computer-readable medium comprising, stored thereupon, a computer program for simplifying for a wireless terminal to locate candidate links in a wireless communication network when communicating with a serving network node via a serving link, the computer program comprising computer program code that, when run in a link locating assisting device in the mobile communication network, causes the link locating assisting device to:
- obtain search limitation data concerning the wireless communication network, wherein the search limitation data defines limits on a link search for a set of candidate links with respect to one or more time offsets and/or frequency offsets from a current link search setting, the current link search setting being a timing and/or frequency setting of the serving link; and
- send said search limitation data to the wireless terminal for use in obtaining limitations for limiting the search for the set of candidate links.

* * * * *